United States Patent [19]
Swearingen et al.

[11] Patent Number: 5,231,828
[45] Date of Patent: Aug. 3, 1993

[54] WRAPPING MECHANISM FOR ROUND BALERS

[75] Inventors: John R. Swearingen, Elliott; Richard E. Jardine; John O. Bradford, both of Gibson City; Loren L. Rathbun, Colfax, all of Ill.

[73] Assignee: M & W Gear Company, Gibson City, Ill.

[21] Appl. No.: 841,407

[22] Filed: Feb. 26, 1992

[51] Int. Cl.⁵ .................. A01F 15/07; A01F 15/14
[52] U.S. Cl. .................................. 56/341; 100/5; 100/88
[58] Field of Search .............. 56/341, 342; 100/3, 100/4, 5, 88, 89

[56] References Cited

U.S. PATENT DOCUMENTS

| | | | |
|---|---|---|---|
| 3,910,178 | 10/1975 | Eggers et al. | 100/5 |
| 4,158,331 | 6/1979 | Campbell et al. | 100/5 |
| 4,169,410 | 10/1979 | Richardson | 100/5 |
| 4,173,112 | 11/1979 | Meiners | 56/341 |
| 4,182,235 | 1/1980 | Harig | 100/3 |
| 4,282,803 | 8/1981 | Cools | 100/5 |
| 4,296,595 | 10/1981 | Meiners | 56/341 |
| 4,306,494 | 12/1981 | Nishibe et al. | 100/5 |
| 4,354,429 | 10/1982 | Boldenow et al. | 100/5 |
| 4,402,259 | 9/1983 | Viaud | 100/5 |
| 4,409,784 | 10/1983 | VanGinhoven | 56/341 |
| 4,427,399 | 3/1984 | Koning | 100/4 |
| 4,517,890 | 5/1985 | Campbell et al. | 100/5 |
| 4,656,930 | 4/1987 | Van Den Bossche | 100/3 |
| 4,656,931 | 4/1987 | Van Den Bossche | 100/4 |
| 4,674,403 | 6/1987 | Bryant et al. | 100/5 X |
| 4,729,213 | 3/1988 | Raes | 100/88 X |
| 4,796,524 | 1/1989 | Renaud | 100/5 X |
| 4,885,990 | 12/1989 | Mouret | 100/5 X |

FOREIGN PATENT DOCUMENTS

0414444A1  5/1981  European Pat. Off. .

Primary Examiner—Terry Lee Melius
Attorney, Agent, or Firm—Allegretti & Witcoff, Ltd.

[57] ABSTRACT

A feeding mechanism for a round hay baler is capable of feeding plastic sheet, netting, or alternatively twine by means of a single set of parallel feed rolls. The device includes a control mechanism which, upon sensing of a full bale having been formed within the baler, initiates a programmed control sequence beginning with driving of one roll for an incremental period of time. The driven roll engage netting, sheet or twine against the second idler roll and feeds the netting, sheet or twine into the bale forming mechanism for wrapping about the bale. Upon completion of the wrapping sequence, a special knife descends and cuts the twine or sheet of netting or plastic. The controller then resets the mechanism.

18 Claims, 13 Drawing Sheets

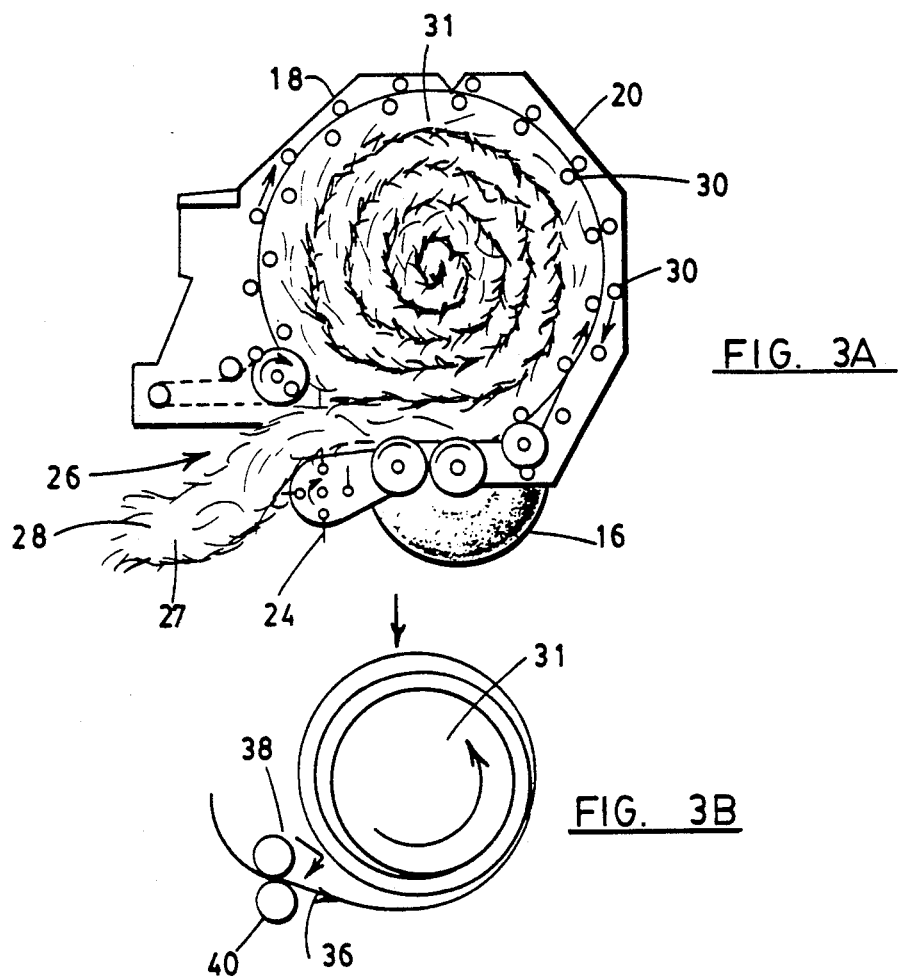
FIG. 3A
FIG. 3B
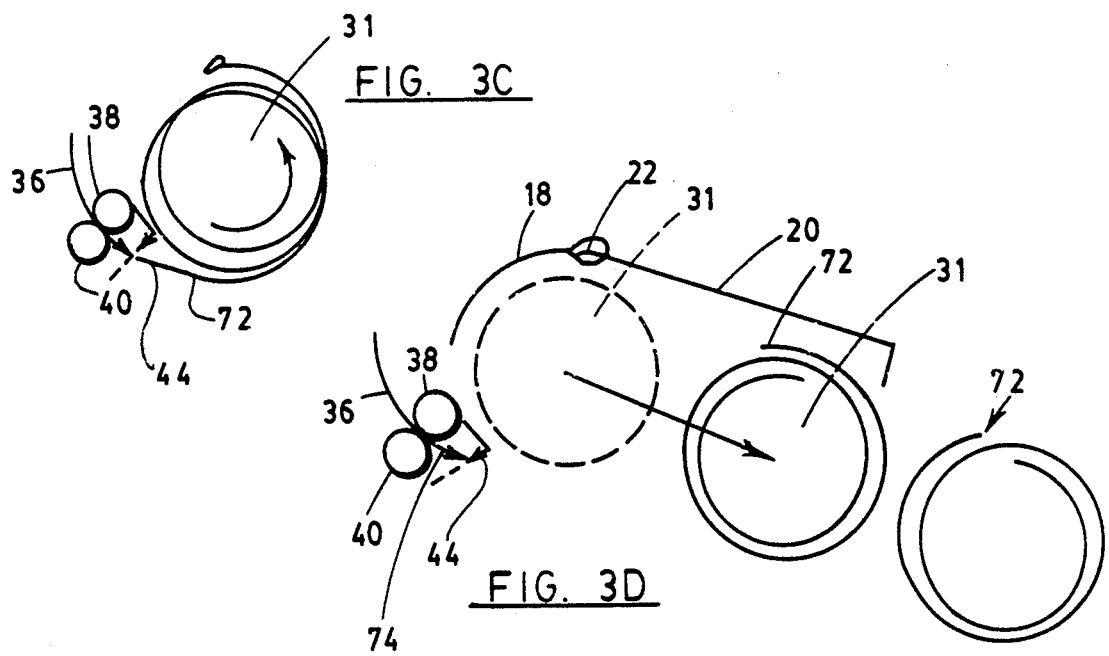
FIG. 3C
FIG. 3D

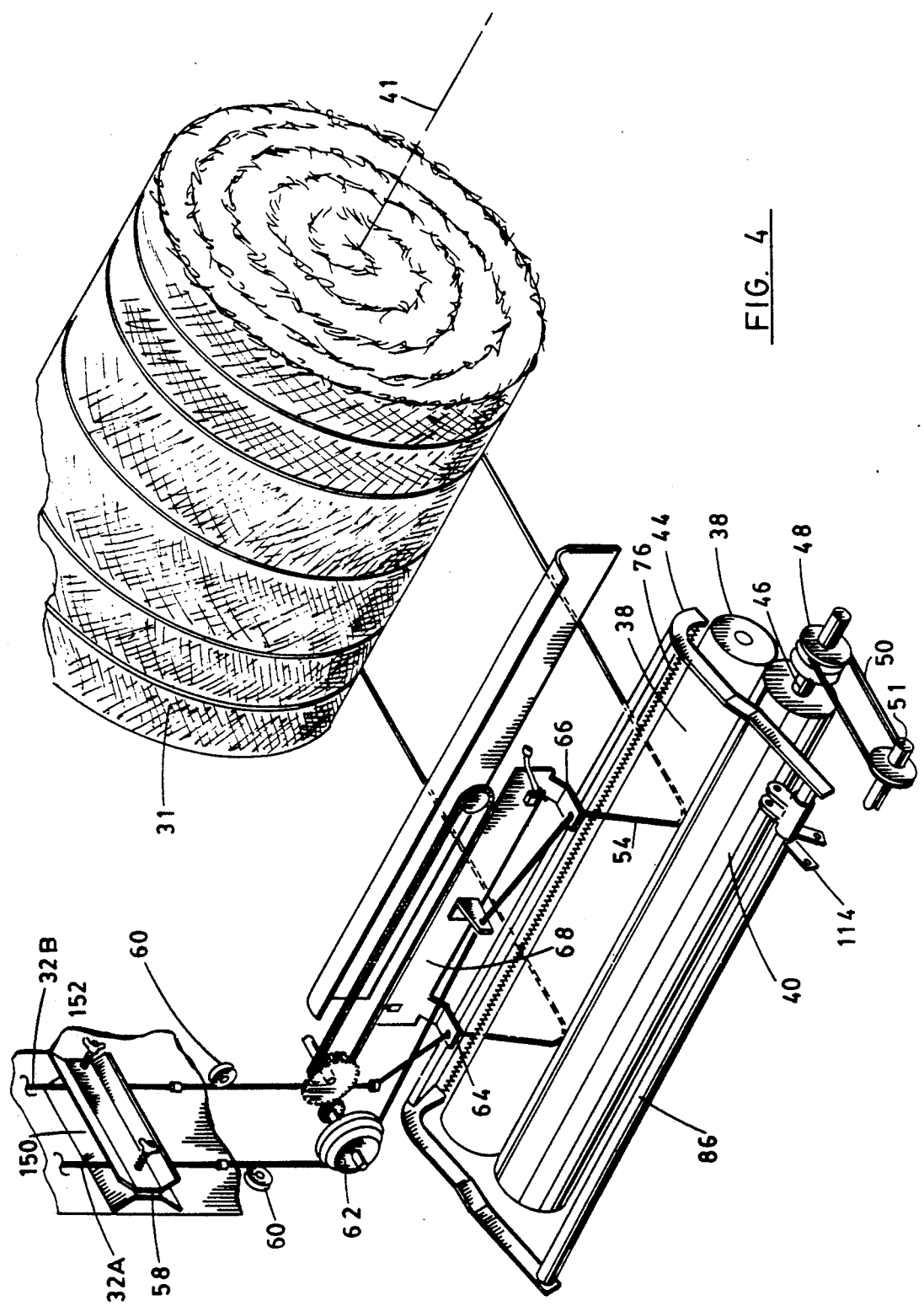

WRAPPING MECHANISM FOR ROUND BALERS

BACKGROUND OF THE INVENTION

This invention relates to an improved baler and, more particularly, to a round bale baler which includes apparatus and controls for wrapping around bale with twine, sheet or netting.

Apparatus or equipment for forming round bales from hay or the like have been commercially available and are the subject of numerous patents. Such farm equipment is now commonly used for baling various types of crops. Round bales formed by such equipment were initially formed without any type of wrapping or twine to maintain the integrity of the round bale. It was determined, however, be beneficial to provide means for wrapping such bales with sheet, netting or twine in order to maintain the integrity of the round bale for storage and transport and to prevent weathering or deterioration of the bale. Equipment was consequently developed for such wrapping, and various patents have been issued which teach mechanisms for wrapping twine or sheet about round bales. Patents which discuss or teach the application of twine about a round bale include the following:

| PATENT NO. | INVENTOR | ISSUE DATE | TITLE |
|---|---|---|---|
| 4,169,410 | Richardson | October 2, 1979 | Independently Controlled Twine Knives |
| 4,158,331 | Campbell, et al. | June 19, 1979 | Center Pivot Dispensing Apparatus |
| 4,182,235 | Harig | January 8, 1980 | Method and Arrangement For Binding Round Balers |
| 4,282,803 | Cools | August 11, 1981 | Twine Wrapper For Round Bale Forming Machine |
| 4,306,494 | Nishibe et al. | December 22, 1981 | Twine Device For Rotary Balers |
| 4,354,429 | Boldenow et al. | October 19, 1982 | Bale Wrapping Apparatus |
| 4,402,259 | Viaud | September 5, 1983 | Binding Device For Cylindrical Bale Forming Baler |
| 4,427,399 | Koning | March 20, 1984 | Twine-Wrapping Mechanism For Mechanism For A Large Round Baler |
| 4,656,931 | Van Den Bossche | April 14, 1987 | Apparatus For Automatically Wrapping Round Bales |
| EPO 041 444 A1 (European) | Viaud | May 26, 1981 | |

Typically, the prior art patents teach mechanisms incorporated in the round baler apparatus which discharge sheets of plastic or netting into the round bale forming mechanism. The plastic sheets or netting are when wrapped around the round baler by continued operation of the baler mechanism. The wrapped bale is then discharged from the baler. The baler may include a separate twine feed mechanism so that twine may be fed into the bale forming mechanism and wrapped about the formed, round bale at the completion of bale formation.

The mechanisms in the referenced prior art patents, though useful for the above identified and discussed purposes, do not provide the benefit of easily changing from a twine wrapping operation to a sheet or netting wrapping operation. Additionally, the mechanisms are rather complex and may require a great deal of service. Applicants have developed an improved apparatus, controls and methodology wherein the apparatus is adapted to use substantially the same mechanism and controls to initiate bale wrapping with either twine or alternatively sheet in the form of plastic wrap or netting. Thus, it is possible for a farm operator to convert from one type of round bale wrapping material to another very easily.

In addition, mechanisms and procedures have been developed for application of plastic sheet or netting about bales. Patents which relate to this technology include the following:

| PATENT NO. | INVENTOR | ISSUE DATE | TITLE |
|---|---|---|---|
| 4,409,784 | Van Ginhoven et al. | October 18, 1983 | Method of Wrapping Roll Bales With Plastic Film |
| 4,517,890 | Campbell et al. | May 21, 1985 | Twine Wrapping Apparatus For A Roll Baling Machine |
| 3,910,178 | Eggers et al. | October 7, 1975 | Apparatus For Wrapping A Round Bale Formed In a Round Bale Forming Machine |
| 4,656,930 | Van Den Bossche | April 14, 1987 | Method of Wrapping Round Bales |
| 4,173,112 | Meiners | November 6, 1979 | Apparatus For Wrapping A Cover Material Around Round Bales |
| 4,296,595 | Meiners | October 27, 1981 | Apparatus For Wrapping A Cover Material Around Round Bales |

SUMMARY OF THE INVENTION

In a principal aspect, the present invention comprises an improved mechanism for feeding twine or, alternatively sheet or netting into a baler of the type for forming round bales. Specifically, a baler of the type for forming round bales from cut field material as it is moved by a prime mover in a forward direction over windrows in a field includes a chassis, a forward hitch for the chassis for attaching the baler to the prime mover, wheeled running gear which supports the chassis, and the bale forming chamber and mechanism on the chassis. The bale forming chamber comprises a housing with a bale forming mechanism therein. The housing includes a fixed forward semi-cylindrical, section and an opposed, movable, semi-cylindrical, rear section which is hinged to the forward section along the top of the housing. The rear section is pivoted about the hinge away from the forward section whenever a fully formed bale is ready for discharge from the baler.

A material entry passage is defined at the lower, forward part of the housing for receipt of the material to be baled. A pickup reel adjacent the material entry passage guides material into the baler housing for forming as a round bale.

The improvement of the present invention comprises means for feeding twine, or alternatively sheet or netting, about the outer circumference of a round bale which has already been formed within the chamber defined by the forward section and rear section of the housing. The means for feeding includes a first idler roll which is parallel to the material entry passage and a second driven roll cooperative with the first idler roll. Both of the rolls are adjacent the material entry passage and, in the preferred embodiment, positioned slightly above that passage and above the pickup reel. A twine holder is mounted above the two rolls and means are provided for directing one or more strands of twine from the twine holder between the rolls. A special guide mechanism provides for movement of the end of the twine axially back and forth along the length of the rolls, so that the twine will be wrapped continuously about the entire width of the circumference of the bale. In the preferred embodiment, two twine guides direct two separate strands of twine in the manner described.

The device further includes a support bar for supporting a roll of sheet or netting above the driven and idler rolls. The sheet or netting is fed between the rolls and into the bale forming mechanism for wrapping about the bale. A special cutoff knife, which extends the length of the rolls, is positioned on the discharge side of the rolls and may be actuated to cut the twine, sheet or netting once a sufficient length of the twine, sheet or netting has been wrapped about the bale. A special computer control system which utilizes a programmable microcontroller is provided to control the sequence, initiation and termination of the wrapping operation for all of the wrapping materials.

Subsequent to cutting of the twine, sheet or netting, the rear section of the housing may be pivoted about its hinge and opened for discharge of the wrapped bale. It is to be noted that during the wrapping operation, the baler is maintained in a fixed position in the field and does not move in the forward direction through the bale within the housing is continuously rotated so as to cause the twine, sheet or netting to be wrapped about the bale. In other words the bale forming mechanism continues to operate during the wrapping procedure though the baler, itself, is not pulled through the field and additional material is not fed into the baler from a windrow.

Thus, it is an object of the invention to provide an improved baler for forming round bales wherein the baler has the capability of wrapping a bale with twine or alternatively, sheet or netting utilizing substantially the same simplified feeding mechanism for twine, sheet or netting.

It is a further object of the present invention to provide an improved baler for forming round bales wherein twine, or alternatively sheet or netting, is fed into the bale forming mechanism for wrapping about a bale formed therein, and wherein, upon appropriate wrapping, a single cutoff knife is provided for cutting of the twine, sheet or netting.

Yet another object of the invention is to provide an improved bale forming mechanism which is capable of wrapping a round bale with twine, or alternatively sheet or netting without the necessity of reconfiguring the wrapping mechanism.

Yet a further object of the present invention is to provide an improved construction for feeding of twine, or alternatively sheet or netting which is economical and simplified relative to prior art constructions.

Another object is to provide an improved baler wrapping mechanism having the fewest number of moving parts, yet which is efficient, easy to repair, and which may be easily incorporated in a round hay baler without extensive alterations in the design or function of the baler.

Yet another object of the invention is to provide a controller for the operation of the baler which is programmable and thus which is capable of efficiently controlling the wrapping mechanism regardless of the wrapping material.

Another object of the invention is to provide a controller for the operation of the baler which may be easily reprogrammed.

A further object of the invention is to provide an improved controller in combination with a baler and a feed mechanism for various wrapping materials.

These and other objects, advantages and features of the invention will be set forth in a detailed description which follows:

BRIEF DESCRIPTION OF THE DRAWING

In the detailed description which follows, reference will be made to the drawing comprised of the following FIGURES:

FIG. 3A is a side schematic view demonstrating the operation of the baler during the material pickup operation when the baler is being transported through a field over a windrow so as to gather material for forming in a round bale;

FIG. 3B illustrates the next step in the operation of the wrapping of the round bale wherein twine, or alternatively sheet or netting is directed about the bale as the bale forming mechanism continues to turn while the baler, itself, has stopped forward movement in a field;

FIG. 3C is a further side schematic view illustrating the termination of feeding twine, or alternatively sheet or netting, into the bale forming mechanism and completion of the wrapping of the bale within the bale forming mechanism again as the baler remains stationary in the field;

FIG. 3D is a side schematic view illustrating discharge of the formed and wrapped bale from the stationary baler;

FIG. 4 is a partial perspective view illustrating schematically the improved twine, or alternatively netting or sheet, feed mechanism of the invention;

FIG. 8A is an enlarged partial perspective, schematic view illustrating the mechanism for reversal of the operation of the twine feeding arms;

DESCRIPTION OF THE PREFERRED EMBODIMENT

General Layout Description

Figure 1:
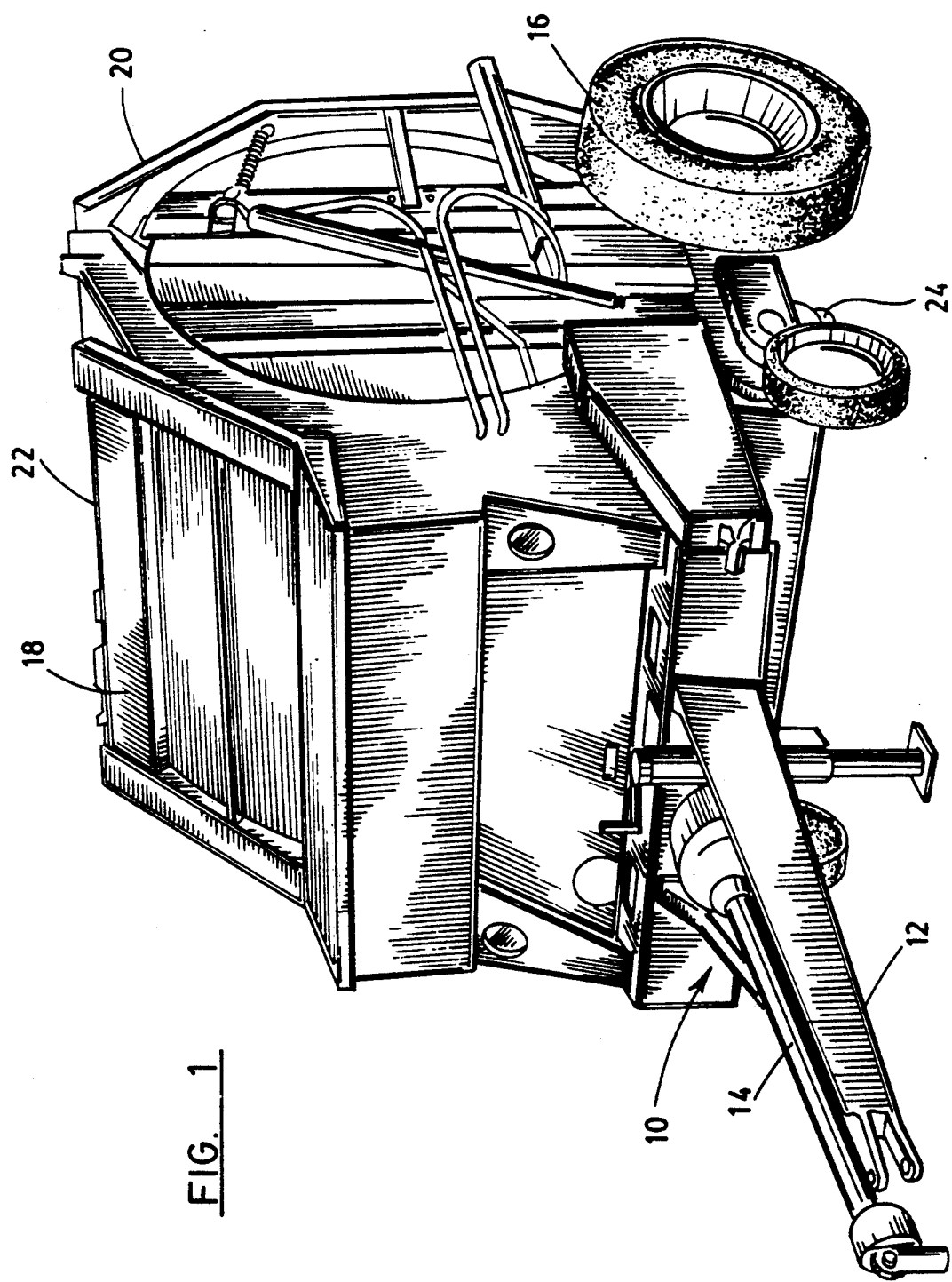
FIG. 1 is a perspective view of a round baler which incorporates the improved wrapping mechanism and controls of the present invention.

FIGS. 1 through 4 illustrate the general construction of the invention and the incorporation of the improved twine, sheet or netting feed mechanism of the present invention in a round hay baler. Referring first to FIG. 1 there is illustrated a typical baler for the formation of round bales. The baler includes a chassis 10 having a hitch 12 for attachment to a prime mover (not shown) for towing of the baler in the forward direction through a field. The forward direction is indicated by the arrow in FIG. 1. A power takeoff 14 is provided for attachment to the prime mover as a source of driving power to the baler. Running gear or wheels 16 support the baler.

The baler includes a housing which defines a chamber for forming a bale. The housing thus comprises a stationary semi-cylindrical, forward section 18 which is mounted on the chassis 10 and a semi-cylindrical, rear section 20 which attached to the forward section 18. The rear section 20 is hinged along a top edge 22 to the forward section 18 so that the rear section 20 may be opened in the manner of a "clam shell" for discharge of a round bale from the baler.

Figure 2:
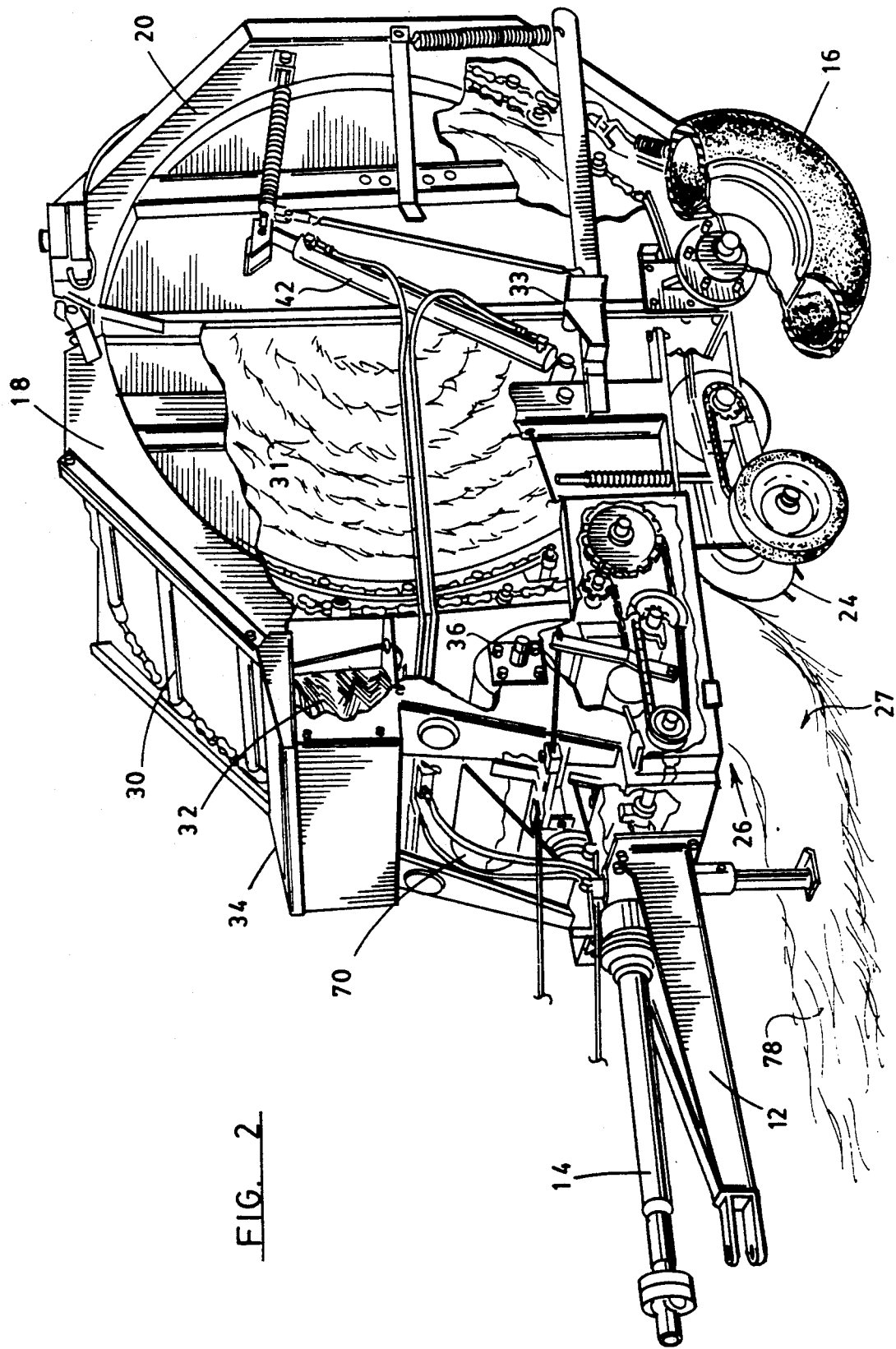
FIG. 2 is a perspective cutaway view of the improved combination of the present invention.

A pickup reel 24 is positioned adjacent a material inlet 26 in FIGS. 2 and 3. The pickup reel 24, as depicted in FIG. 3A operates to cause material 27 in a windrow 28 to be directed into the inlet 26 for introduction into the chamber defined by forward and rear sections 18, 20 where it formed as a round bale by a round bale forming mechanism. For example, hay, silage or the like may be the material 27 which is formed as a round bale. As depicted in FIG. 3A, a schematic side view of the baler, the material 27 from the windrow 28 is formed by linked or connected compacting bars 30. The bars 30 are configured and constructed in U.S. Pat. No. 4,212,149, incorporated herein by reference and thus compact the material 27 into the form of a round bale 31 as the baler is moved forward through a field.

Applicant's assignee has made such round bale forming mechanisms which form round bales using bars 30 in the manner described: M&W Round Baler Model No. 4590. The round bale forming mechanism is, however, not a limiting feature of the invention.

Sensors 33 in FIG. 2 associated with the bale forming mechanism indicate that a full bale 31 has been formed and compacted within the chamber formed by the forward section 18 and the rear section 20. Sensors 33 effectively sense that the chamber is filled and the expansive force of the bale 31 in the chamber causes the rear section 20 to begin to separate from the forward section 18 by pivoting about hinge 22. Sensing of the formed bale is transmitted to the farm operator as an audible and/or visible signal. Subsequently, the farm operator or computer initiates the wrapping operation by means of the additive feature of the present invention. At this stage, in the operation of the baler, the baler is stopped from further movement in the field. The programmable controller (described below) is thus started, and twine 32, from a twine storage chamber 34 or, alternatively, sheet or netting 36 from a sheet or netting roll, will be fed by a pair of rolls 38, 40 into the inlet side of the bale forming chamber as depicted in FIG. 3B adjacent material inlet 26.

The improvement of the invention thus relates to the specific controls and mechanism for feeding twine 32, or alternatively sheet or netting 36, between rolls 38 and 40, as described in greater detail below. The twine 32, sheet or netting 36, is initially fed by operation of the rolls 38 and 40 is caught and pulled around by the bale rotation. Simultaneously, the bale forming mechanism associated with the chain linked bars 30 continues to operate and rotates the formed bale 31 in the counterclockwise direction as illustrated in FIG. 3B. In this manner, the twine 32, sheet or netting 36 is wrapped about the outer surface of the bale 31. The continued operation of the bale forming mechanism associated with the bale 31 will thus continue to draw twine 32, sheet or netting 36 thereabout. Subsequently, after a preselected number of wraps of twine 32 or a preselected time, sheet or netting 36 about the formed bale 31, a knife 44 will cut the twine 32, sheet or netting 36 as illustrated in FIG. 3C. Next, the rear section 20 pivots outwardly about hinge 22 as illustrated in FIG. 3D by operation of actuating cylinders 42, as illustrated in FIG. 2, and the formed bale 31 with wrapping material of twine 32, sheet or netting 36 are thereabout is discharged from the chamber formed by the forward section 18 and rear section 20. The rear section 20 is then closed by action of double acting cylinders 42, and the baler is again pulled by the prime mover through the field so that the pickup reel 24 may feed further material 27 from a windrow 28. The process then repeats itself.

The choice of whether twine 32 is used, or alternatively sheet or netting 36, is controlled by the baler operator. Switching from use of one to the other is easily accomplished as will be explained in further detail below. For purposes of the general description, however, it is to be noted that twine 32, as well as a roll of sheet or netting 36, are carried by the baler. Both are carried for positioning through the same pair of feed rolls 38 and 40; and both are carried so that each may be cut by the same knife construction 44. The timing of the feeding of both is substantially the same, although it may be varied depending upon the material involved. Both are initially fed by powered operation of rolls 38, 40 into the bale forming mechanism for a limited period of time which permits the twine or sheet to be engaged in the bale compacting mechanism. Thereafter the power feeding operation of the rolls 38 and 40 is terminated. That is, after initially being fed into the bale forming chamber, by rolls 38, 40 the twine 32, sheet or netting 36 is, in essence, pulled around the bale 31 by the bale forming mechanism itself.

The entire operation and sequence is controlled by means of a programmable microcontroller which (1) initially senses the formation of a full bale; (2) controls subsequent short-term feeding of twine 32, sheet or netting 36 through rolls 38 and 40; (3) signals the need to stop the movement of the baler in the field; (4) waits for the continuing operation of the bale-forming mechanism (bars 30) by rotation of bale 31 for a number of times in order to effect wrapping of the bale 31 with twine 32, sheet of netting 36 as the case may be; (5) subsequently initiates cutting of the end of the twine 32, sheet or netting 36; (6) signals the completion of the wrapping process, signaling the operator to open and discharge the formed and wrapped bale 31 from the bale forming chamber which subsequently automatically terminates the operation of the bale forming mechanism; (7) signals the successful closing of the baling chamber; and (8) resets for restart and recycling of the entire operation. During this entire operation each step is checked for errors and, if any, signals the operator. The separate component parts identified by the general description are discussed in greater detail below.

Twine and Sheet Feed Mechanism

Figure 5:
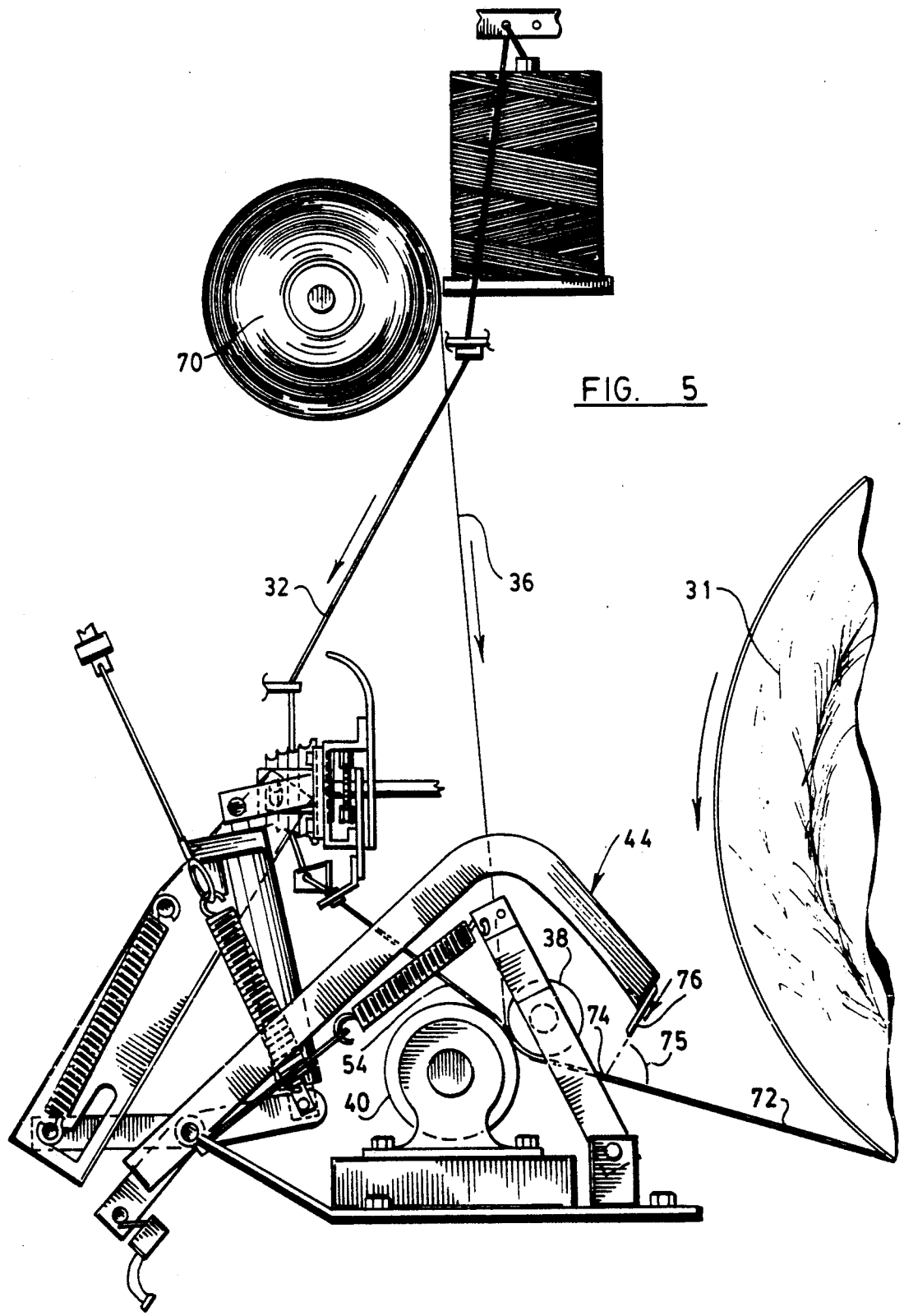
FIG. 5 is a side elevation of the improved mechanism depicted in FIG. 4.
Figure 6:
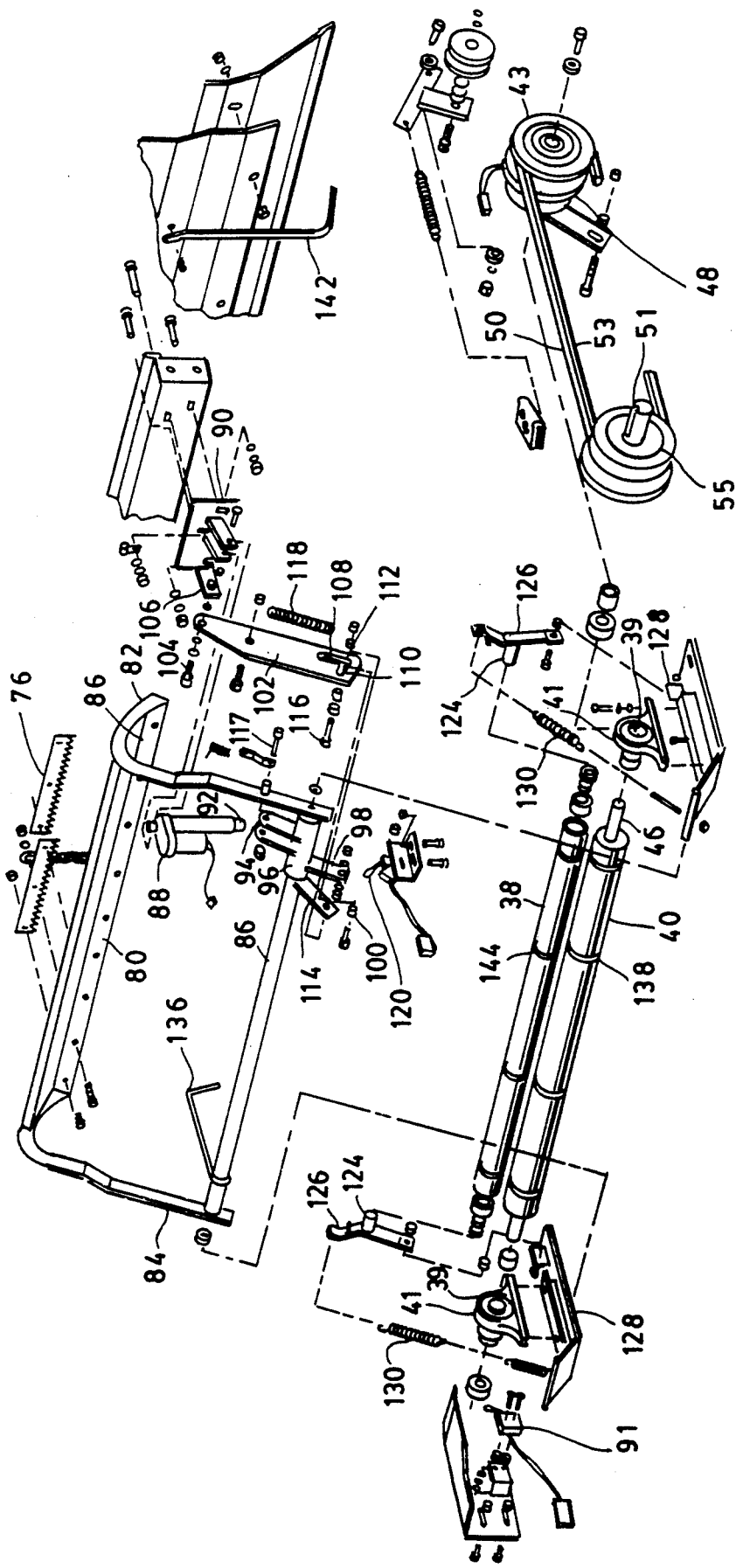
FIG. 6 is an exploded perspective view of the construction of the feed rolls and knife for feeding twine, netting and sheet.
Figure 7:
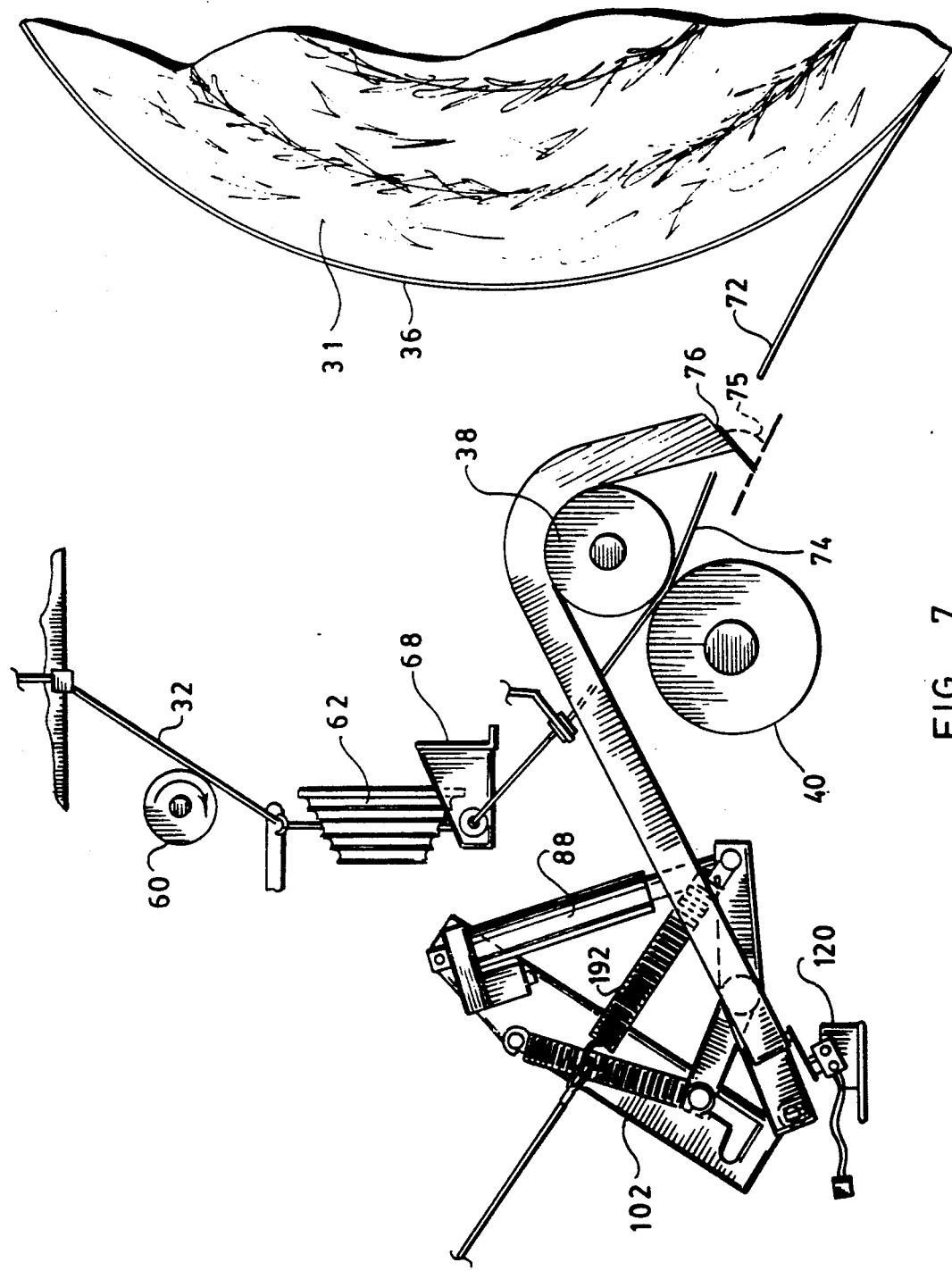
FIG. 7 is a side view of the operation of the knife for cutting of the twine, netting and sheet.

Referring to FIGS. 4, 5 and 6, there is illustrated the twine/sheet/netting feed and cutoff mechanism. The rolls 38 and 40 are mounted adjacent the material inlet 26. Roll 38 is an idler roll. Roll 40 is a driven roll. In practice roll 40 is a rubber coated roll whereas the idler roll 38 is typically coated with rubber or polytetrachoroethylene (Teflon) or has an aluminum surface. The twine 32, sheet or netting 36 is more effectively gripped with such a combination of coated rolls.

The rolls 38 and 40 have a width approximately equal to the width of a bale 31. The rotation axes of rolls 38 and 40 are generally aligned parallel with the rotation axis 41 of the bale 31 which is formed within the chamber defined by the housing sections 18 and 20. Roll 40 is mounted on a shaft 46 and is connected through a clutch 48 by a drive train 50 to a drive shaft 51 connected to the power take off for the baler. In operation, either twine 32 or a sheet of plastic or netting material 36 is fed between the rolls 38 and 40.

The twine 32 is generally fed from a twine balls in twine storage chamber 34 and typically two strands of twine 32 are fed therefrom. The strands of twine 32 are fed through a tensioner 58. Sensor wheels 60 are provided to sense the movement of twine 32. One strand of the twine 32 is then fed through a drive pulley 62, and the two strands are fed into separate twine guide members 64 and 66. The twine guide members 64, 66 are mounted on a carriage 68 which traverses back and forth parallel to the axes of the rolls 38 and 40. In this manner, the strands of twine 32 are fed back and forth across the surface of a bale 31 as the bale 31 is being formed and wrapped. Alternatively, netting or sheet 36 is fed from a roll 70 downward between rolls 38 and 40. The netting or sheet 36, once positioned or started between the rolls 38 and 40, will continue to pass between those rolls 38 and 40. A knife construction 44 is designed to slice or cut the twine 32 or the sheet 36 downstream from the rolls 38 and 40 thereby define a free end 72 which fits about the bale 31 and the remaining end 74 between the rolls 38, 40 as shown in FIGS. 3D and 5. Note, in operation the knife construction 44 includes a blade 76 which cuts into or engages the twine 32 or sheet 36 at an angle 75 in the range of fifty degrees (50°) to seventy (70°) as illustrated in FIG. 5. This angle 75 of cutting, which is an acute angle, has been determined to be important in order to provide efficient cutting. That is the preferred angle 75 insures slicing the netting 36 or twine 32 at an acute angle. By using a serrated blade 76, as illustrated in further FIGURES, for example, FIG. 5, the cut is a shear cut which cleanly severs the free end 72 from the remaining end 74.

Referring again to FIG. 6, a microswitch 91 is mounted adjacent one end of shaft 46 to sense the rotations of the driver roll 40. An infrared sensor (not shown) may be mounted adjacent the knife construction to sense the presence of sheet 36.

Cutting Knife Construction

FIG. 6 illustrates in greater detail, in an exploded view, the construction of the knife 44 as well as the feed rolls 38 and 40. Driven roll 40 is appropriately journalled in bearings 39 mounted on brackets 41. The roll 40 includes a drive shaft 46 connected through an electrically controlled clutch 48 which is driven by the power take off through a drive train 50 which includes clutch pulley 43, belt 53, and power takeoff pulley 55 associated with the drive power takeoff shaft 51 connected to the power source for the baler.

The idler roll 38 is mounted on pins or shafts 124 each retained on spaced pivoting brackets 126 which are pivotally mounted on fixed brackets 128. Anchored springs 130 engage against the opposite end of the bracket 126 to thereby bias the idler roll 38 against the driven roll 40 and compress the rolls 38, 40 against one another.

The driven roll 40 cooperates with straps 136 which fit in slots 138 associated with the roll 40. The straps 136 facilitate guiding of sheet 36 between the rolls 38 and 40. Secondary straps 142 are provided for cooperation with slots 144 associated with the idler roll 38. In this manner, straps 142 and 136 are provided to guide sheet or netting for both the idler roll 38 and the driven roll 40.

The knife construction 44 includes numerous serrated blades 76 which are attached to a blade arm 80. The blade arm 80 includes integral spaced support brackets 82 and 84 which are attached to a pivot bar 86. The brackets 82 and 84 are configured so that when the blade 76 impinges against the sheet 36 or twine 32, as previously described, the angle of cutting will be in the range of fifty degrees (50°) to seventy degrees (70°). The brackets 82 and 84, thus permit the blade 76 to be pivoted toward the sheet 36 or twine 32 or away from the sheet 36 or twine 32. Normally, the brackets 82 and 84 are biased by mechanical means toward cutting engagement, but are restrained from moving in that direction by means of a retention mechanism which is disengaged at the appropriate time for release of the brackets 82, 84 and thus engagement of the blade 76 against the sheet 36 or twine 32.

The mechanism for driving the blade 76 is described as follows. A bidirectional actuator 88 is mounted on a fixed bracket 90. The actuator 88 includes an extendable rod 92 which is connected to a lever arm 94 radially projecting from a cylinder 96 slidably mounted on the outside of the rod 86. A second lever arm 98 extends radially from the opposite side of the cylinder 96 and connects with a pin member 100. The member 100 is positioned to engage against the underside of a bar 102 pivotally mounted on a pivot pin 104 attached to a fixed bracket 106. An L-shaped slot 108 is defined in the member 102. The slot 108 has a first locking run 110 and a second release run 112. A radially extending lever arm 114 welded to the bar 86 includes a follower 116 which fits within the slot 108.

In the normal retention position, the follower 116 resides in the first locking run 110. A coil spring 118 is attached to the pin 116 at one end and is anchored to the plate or bar 102 at its opposite end. To effect release of follower 116 from lacking run 110 into the release run 112, the actuator 88 and more particularly the rod 92 is extended. This causes the lever arm 94, cylinder 96 and arm 98 to pivot thereby engaging the pin 100 against the underside of the bracket plate or bar 102. This causes the bracket arm 102 to pivot about its axis defined by pin 104 causing the pin 116 in response to tension in coil spring 118 to move along the run 110 and into the run 112 thereby releasing the pin 116 for sudden sliding movement in the run 112. This causes the spring 118 to thereby pivot the arm 114 connected to rod 86 and thus the support arms 82 and 84. In this manner the blade 76 is driven to engage against the sheet 36 or twine 32 and thereby cut the sheet 36 or twine 32.

The full travel of the pin 116 in the run 112 is sensed by the microswitch 120 which is actuated by pivoting of the lever arm 82. This causes a signal to the controller to then effect reversal of the movement of the knife 44 and associated parts. To reset the mechanism, actuator rod 92 is reversed in operation thereby engaging a pin 117 on arm 94 to engage the underside of arm 82. This causes the follower 116 to follow a reverse path from run 112 into locking run 110.

Twine Feed

Figure 8:
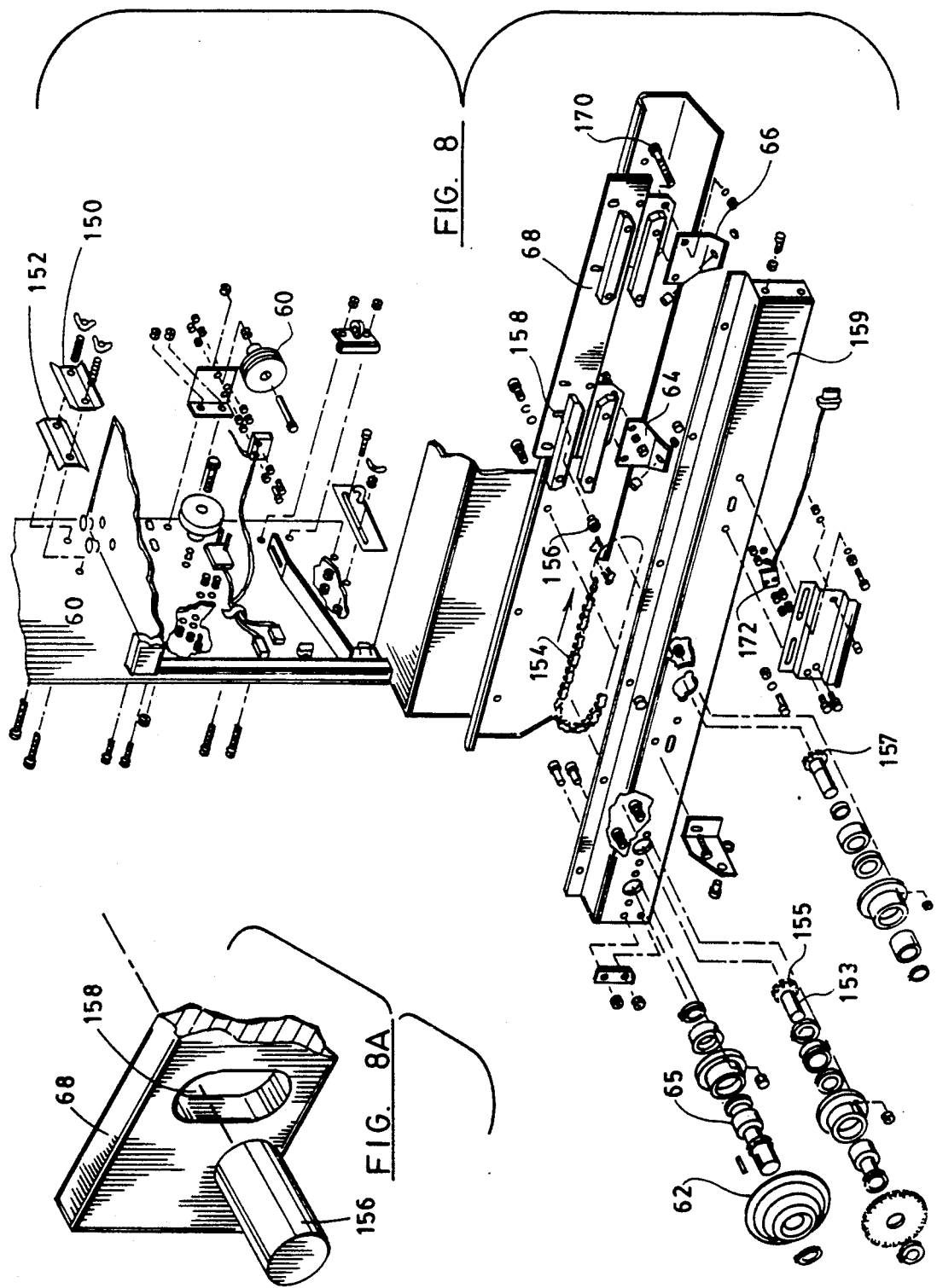
FIG. 8 is an exploded perspective view of the twine feed mechanism of the invention.
Figure 9:
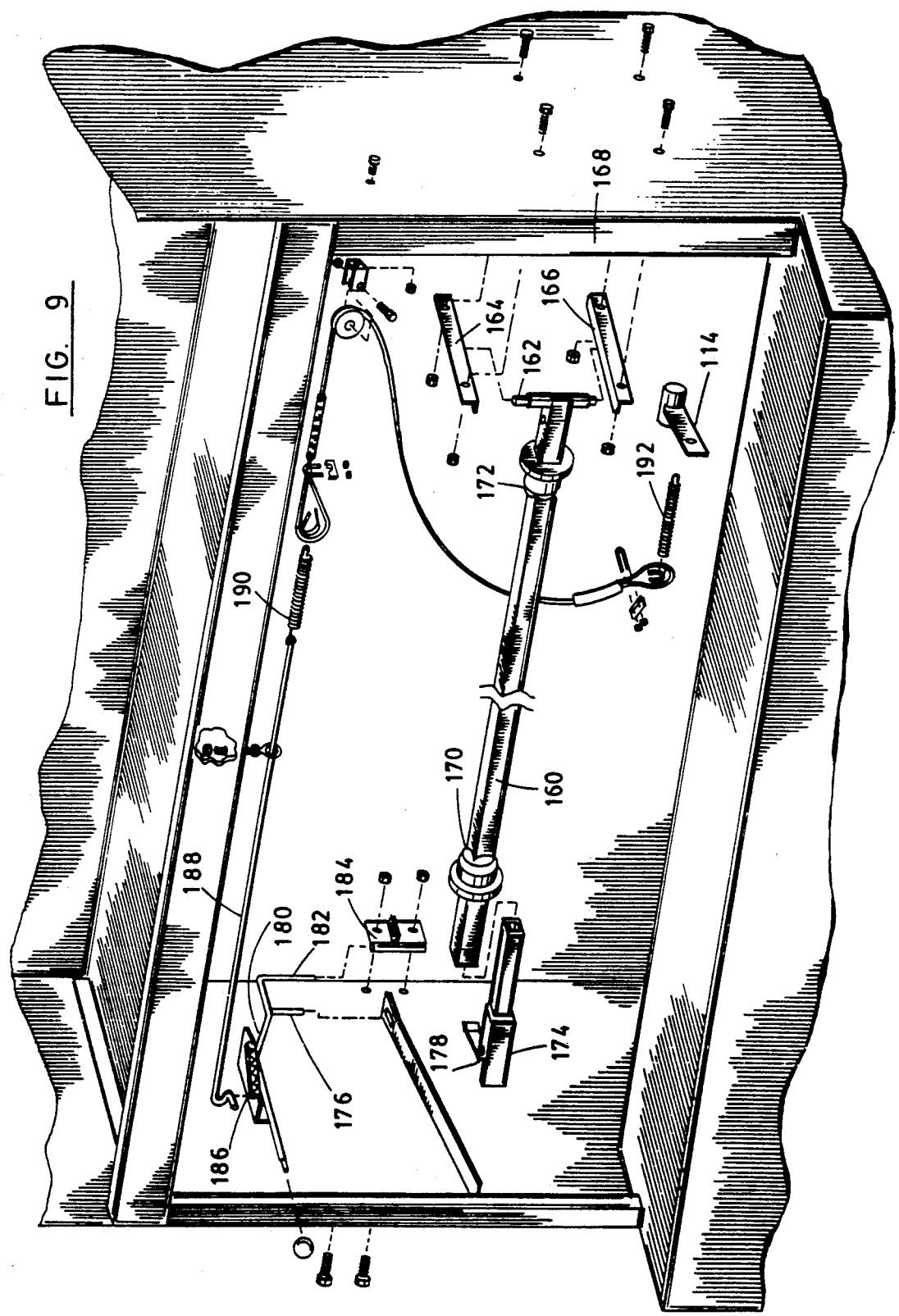
FIG. 9 is an exploded perspective view of the sheet or netting support mechanism.

FIG. 8 illustrates in greater detail the construction of the twine feed mechanism. As previously indicated twine 32 is fed from a twine storage chamber or bin 34 through spaced tension plates 150 and 152 defining a tensioner 58 to provide appropriate tension on the twine 32. The twine 32 then feeds through guides and around sensor wheels 60 shown in FIG. 8. One strand 32A in FIG. 4 passes over a pulley 62, which is journalled into bearings 65, and causes the pulley 62 to rotate as twine is pulled over the pulley 62. The pulley 62 is coupled or geared to drive a shaft 153 which, in turn, drives a continuous chain 154 mounted on appropriate spaced gears 155 and 157 mounted in bracket 159. A pin 156 on chain 154 fits through a slot 158 in the movable carriage member 68. The carriage member 68 is slidably mounted in a bracket 170 so as to be movable back and forth in the direction of the axes of rolls 38, 40. Pulling of twine over the pulley 62 will thus cause the lower run of chain 154 to be driven in the direction of the arrow in FIG. 8. This causes the pin 156, which is engaged with the slot 158, to transport the carriage 68 to the left side of the bales, right side of FIG. 8, as shown in FIG. 8. The pin 156 remains in the slot 158 and then follows upwardly (See FIG. 8A) in that slot 158 to thereby effect reversal of the direction of the carriage 68 as it is carried by the upper run of chain 154. In this manner, twine guides 64 and 66, which are attached to the carriage 68, move back and forth with sliding movement of the carriage carrying the twine 32 back and forth as it feeds between the rolls 38 and 40. Traversing of the carriage 68 back and forth in this manner is sensed by a microswitch 172. Sensing one or more counts of the microswitch 172 may be used to determine the extent of wrapping of the bale 31 and thereby effect operation of the cutting knife blade 76.

Sheet Roll Storage and Support Mechanism

Figure 10:
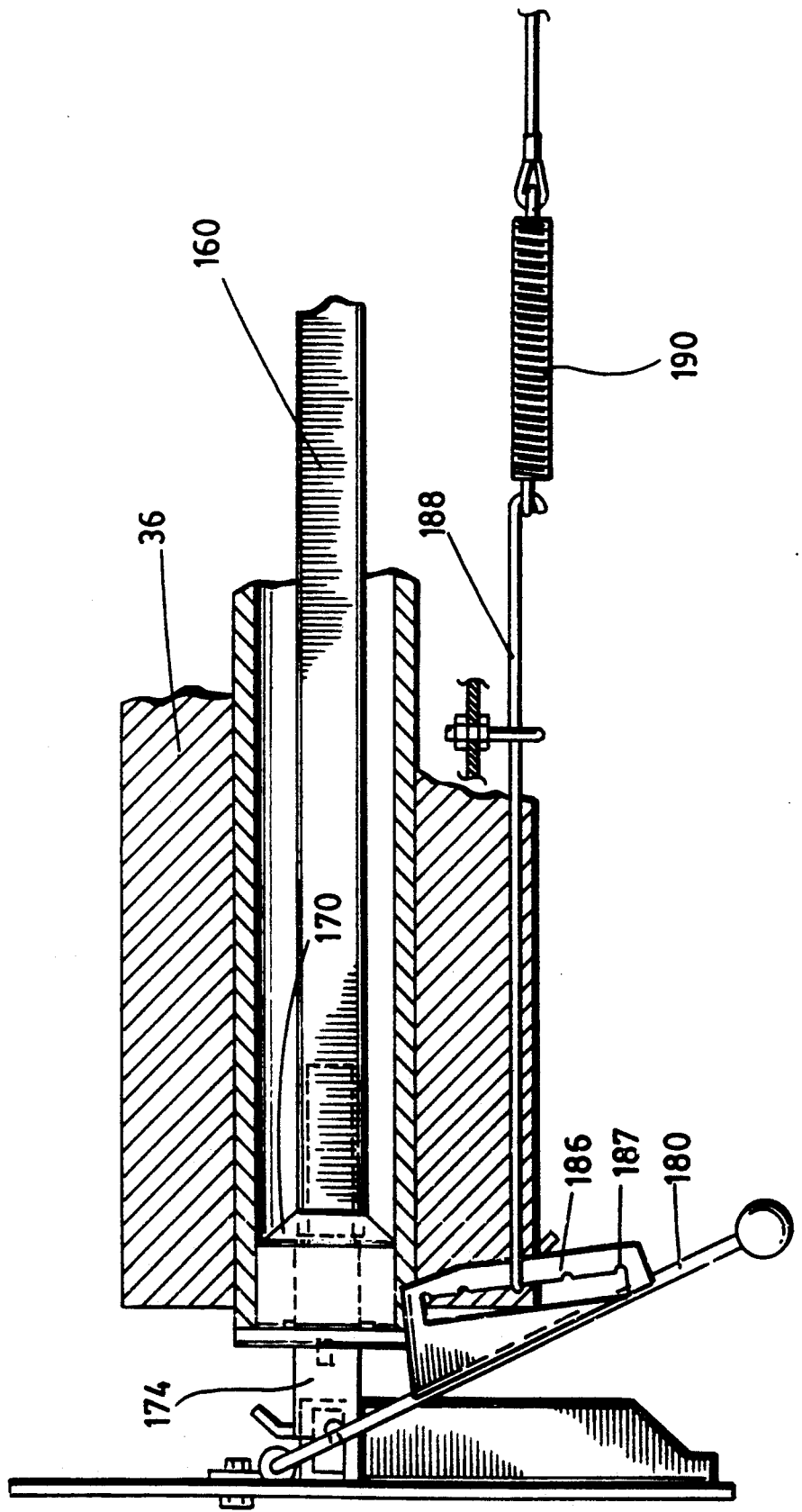
FIG. 10 is a plan view of the mechanism of FIG. 9.
Figure 11:
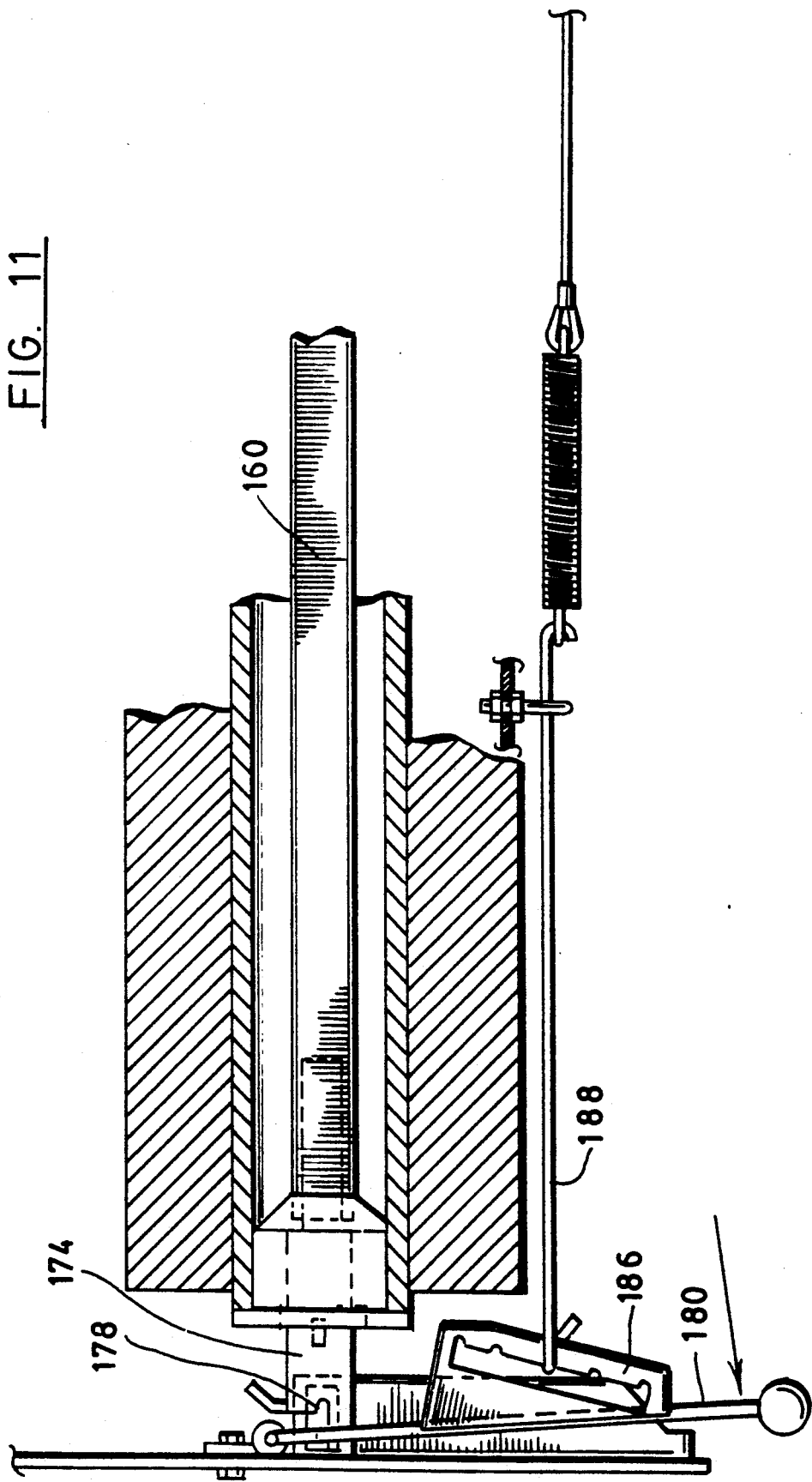
FIG. 11 is a plan view similar to FIG. 10 wherein the latch for holding the netting roll has been released.
Figure 12:
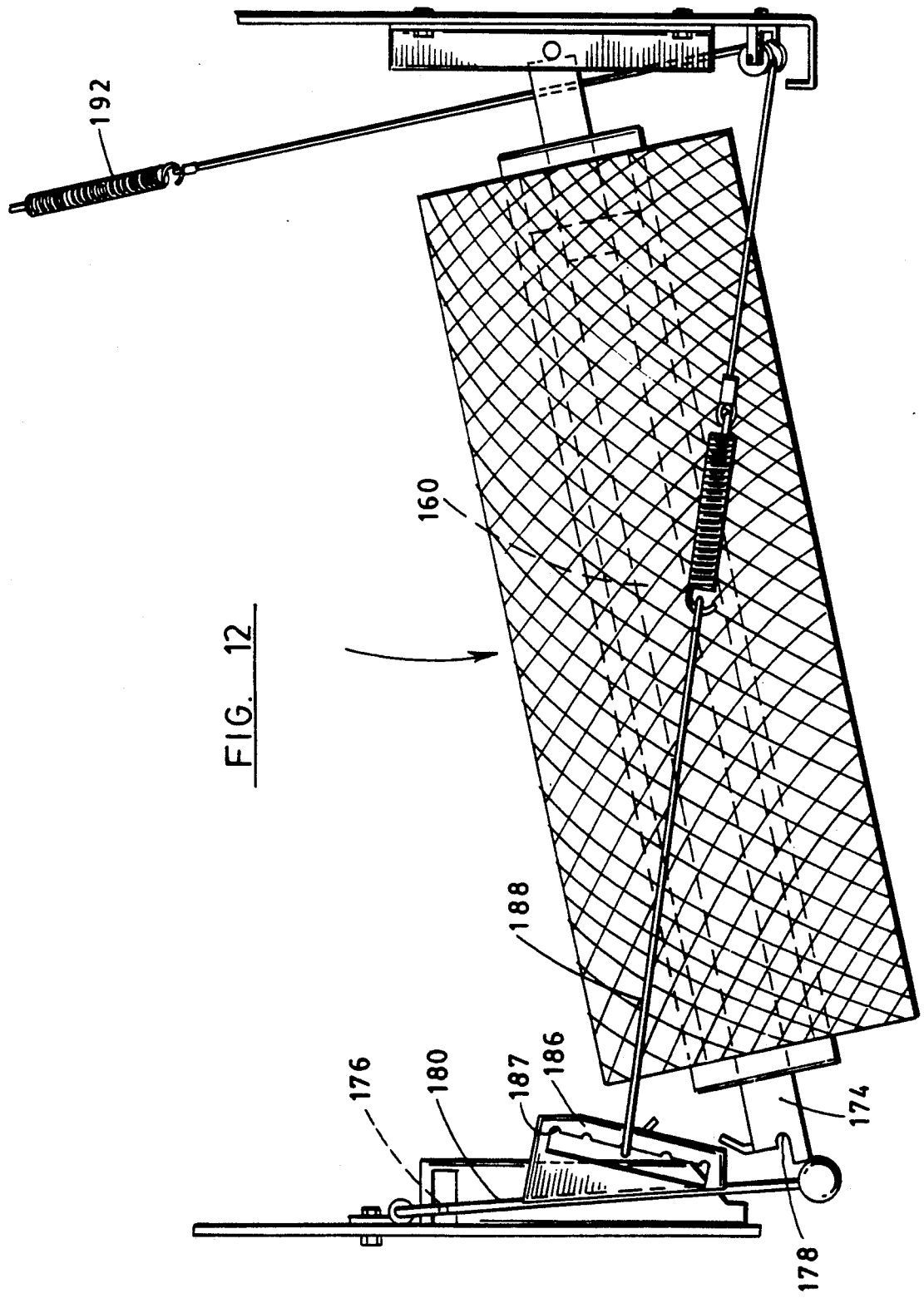
FIG. 12 is a plan view similar FIG. 11 illustrating operation of the netting roll support mechanism.

FIGS. 9 through 12 disclose in greater detail the construction of the mechanism for supporting a roll of sheet material 36 or netting material 36. An elongated bar 160 is supported pivotally at one end by a rod 162 that is journalled in brackets 164 and 166 in the housing 168 for the roll of sheet or netting 36. The bar 160 includes a spaced hubs 170 and 172 which cooperate with the roll 36 to maintain the roll 36 in position on bar 160. The free end of the bar 160 includes a telescoping clamp on latch bar 174 which is telescoped into bar 160 and which cooperates at its opposite end with a biased latching pin 176. The pin 176 engages a groove 178 in the slidable latch 174. Bar 174 also impinges against hub 170 as shown in FIG. 10.

The tension on the pin 176 is adjustable. Thus, the pin 176 is attached to an arm 180 welded or which has a pivot rod 182 (FIG. 10) journalled in a hinge plate 184. The opposite end of the arm 180 is welded or attached to a plate 186 (FIG. 10) having a series of adjustment slots or openings 187. Plate 186 receives a rod 188 which is biased by springs 190 and 192 connected to a lever arm 114 (FIGS. 4–6). The rod 188 may thus fit into any one of the plate openings 187 to thereby adjust the tension against the slidable actuator housing 174 which is positioned against the hub 170. In this manner, the tension on the roll of sheet or netting materiaL 36 may be adjusted. Release of the bar 160 so that it may be pivoted to the position of FIG. 12 may be effected by manually actuating the arm 180 against the biasing force of the springs 190 and 192 to release pin 176 from groove 178.

Biasing spring 192 is anchored to the knife mechanism 44 as illustrated in FIGS. 4 & 5 via lever arm 114 on rod 86. Thus, during the knife cutting operation increased tension is effected via pivoting of rod 86, arm 114 and then on rod 188. Thus, increased tension is provided on the roll of sheet 36 so that the sheet 36 cannot be accidentally unwound as the knife 44 descends. Inertia of the movement of the roll of sheet material 36 on the bar 160 is thereby terminated during the knife 44 actuation operation as a result of increased tension on rod 188.

Programmable Microcontroller System

The control system for the twine/netting/sheet wrapping mechanism is carried on board the prime mover (tractor), and utilizes an programmable microcontroller. The principle signals that are relied upon to initiate the control sequence are derived from bale formation sensors 33 which indicate that a full bale has been formed with in the chamber defined by sections 18 and 20. Typically, two sensors are utilized, one on each side of the baler, to sense a filled chamber; however, the particular scheme for sensing a fully formed bale is not a limiting feature of the invention. The signal associated with sensing a fully formed bale is used to either automatically initiate the twine/netting/sheet wrapping operation or alternatively the operator is signalled so that he may manually initiate the control sequence including the choice of wrapping material. The particular program utilized to effect the wrapping cycle as well as the particular micro-controller are not limiting features of the invention. The concept of using timed operation of the feed rolls 38, 40, and utilizing the previously described sensors to monitor the operation, particularly in combination with the described mechanisms, is considered novel however. Thus, the following description sets for the sequential steps monitored and controlled by the microcontroller, programmed in accord with the described steps and reprogrammable in view of the choice of microcontroller, i.e., E²PROM.

Figure 13:
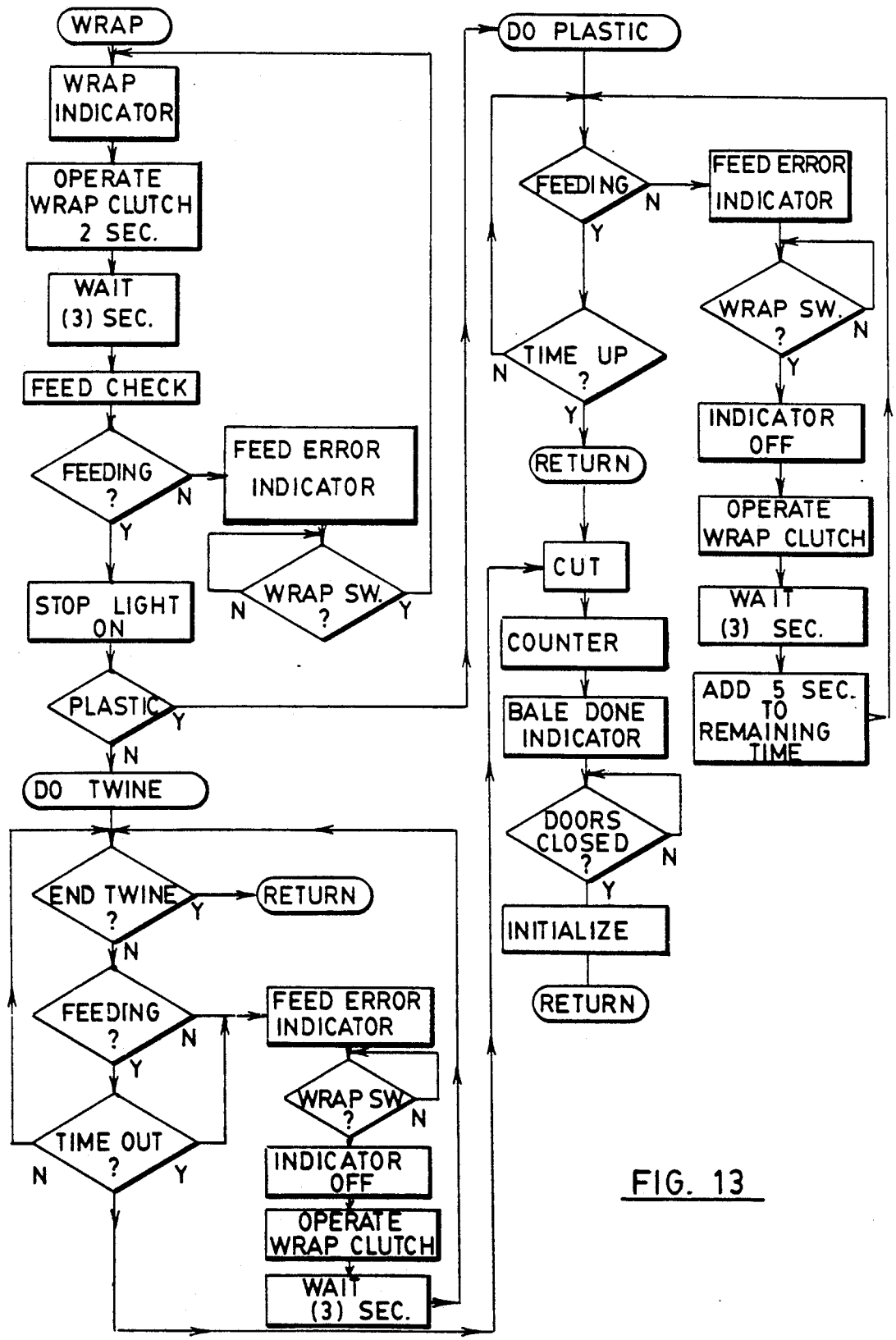
FIG. 13 is a control schematic illustrating the programmable control system.

Referring, therefore, to FIG. 13, the wrapping sequence begins subsequent to an initiation signal provided automatically or manually after the sensors 33 indicate a full bale. The operator will have set the baler for twine or sheet operation by positioning twine or sheet between the rolls 38, 40 and by further setting the controller on board the tractor for sheet or twine operation. Having set the controller and also having filled the chamber with a full bale 31, and assuming that sheet 36 is to be wrapped about the bale 31, the clutch 48 is operated for a preprogrammed interval (e.g. 2-5 seconds) to thereby draw sheet from a storage roll and feed that sheet 36 into the bale forming chamber which is operating the baler mechanism and thus rolling the bale by means of the chain linked bars 30. A sensor, e.g. on infrared sensor (not shown) detects sheet on the downstream side of the rolls 38, 40. Microswitch 91, FIG. 6 also provides a signal indicating operation of the rolls 38, 40 and passage of sheet therebetween. The sheet 36 is feed for a timed interval, (e.g. 2-5 seconds). Then the clutch 48 is disengaged according to a programmed signal. The sheet 36 is continuously drawn into the bale forming chamber by the action of the bale forming mechanism. The operator will have chosen the number of layers of sheet wrapping and will have programmed the controller with that choice. This programmed input may be accomplished in any of a number of ways. For example, the revolutions of the formed bale 31 may be directly sensed by monitoring the cycles of the link or chain which controls the compacting bars 30. Alternatively, the number of revolutions of rolls 38, 40 may be sensed by switch 91. Switch 91 also provides a signal indicating that sheet 36 or twine 32 continues to be fed between the rolls 38, 40. A fixed time operation of the baler may be programmed. For example, the baler mechanism may continue to run for 5 to 20 seconds thereby wrapping the bale during that time period.

In any event, subsequent to application of the desired number of programmed wraps, the microcontroller initiates action of the actuator 88 to effect operation of knife 44. After the knife 44 makes the cut as sensed by sensor 120, the microcontroller signals to reverse operation of a actuator 88 and thereby reset the mechanism. The discharge cylinders 42 are then actuated to effect opening of rear section 20 and discharge of the bale 31. Almost simultaneously or after a short time delay, the baler compacting and wrapping bars 30 are stopped. After the bale 31 is discharged, the cylinders 42 reverse and closed the sections 18, 20. The microcontroller senses that the sections 18, 20 are closed and automatically resets for further operation. Also during the closing of sections 18, 20, the wrapping bars 30 drive is reengaging.

In the event the twine wrap sequence is chosen, the operator will have previously fed the twine 32 between the rolls 38, 40. Subsequent to sensing a full bale 31, the rolls 38, 40 will again be driven by timed actuation of the clutch 48. Again, the twine feeding operation is initially effected by driving roll 40, but eventually the operation of the bale forming mechanism of the baler will effectively pull the twine 32 into and around the bale 31 as power to the driving roll is terminated. Sensors 60 will sense whether twine 32 is in motion. The duration of feeding, twine may be controlled in the manner previously described for sheet or additionally forthholding the speed of the reciprocation of carriage 68. FIG. 8, note FIG. 9 also has an item 172 which is not a switch. Reciprocal movement of carriage 68 is important in order to position twine evenly over the surface of bale 31. Again, after the bale 31 is wrapped with twine 32, knife 44 cuts the twine 32 and discharge is effected by operation of cylinders 42. The microcontroller is then reset for the next cycle.

It is possible to vary the construction and operation of the invention without departing from the scope of the invention. For example, the microcontroller program and elements may be varied. The inputs to the microcontroller may be varied. Thus, while there has been set forth a preferred embodiment of the invention, it is to be understood that the invention is to be limited only by the following claims and their equivalents.

What is claimed is:

1. In a baler of the type for forming round bales from cut field material as it is towed by a prime mover in a forward direction over windrows in a field, said baler including a chassis, a forward hitch for the chassis for attaching the baler to a prime mover, wheels supporting the chassis, a bale forming chamber on the chassis including a housing having a bale forming mechanism, said housing including a fixed, forward section on the chassis and a movable rear section separable, at least in part, from the fixed section to permit discharge of a formed bale from the chamber, a material entry passage into the forward section for receipt of material to be baled from a windrow, a pick up reel on the chassis adjacent the material entry passage for picking and guiding material to be baled from a windrow into the material entry passage as the baler moves over a windrow, the improvement comprising means for feeding twine or a bale wrapping sheet or netting about the outer circumference of a round bale formed within the chamber, said means comprising, in combination:

a first idler roll mounted generally parallel to the material entry passage in the forward section;

a second driven roll mounted in the forward section parallel to the first roll and positioned to cooperate with the first roll for pulling of twine or a sheet or netting there between and for discharging said twine or sheet or netting into the material entry passage and the chamber;

a twine holder mounted on the forward section;

means for directing one or more strands of twine from the twine holder;

a twine guide adjacent the rolls for positioning a twine strand at a desired position through the rolls and intermediate the ends of the rolls;

a translatable carriage mounted on the front section for supporting the twine guide and for reciprocally moving the twine guide alternately back and forth between the ends of the rolls;

a carriage drive mechanism for driving the carriage back and forth between the ends of the rolls, said drive mechanism including means cooperative with a strand of twine fed between the rolls for actuating the carriage drive mechanism whenever a strand of twine passes between the rolls;

a roll support bar rotatably mounted on the forward section for maintaining a roll of sheet or netting having a leading discharge end that feeds between the rolls;

tension means for the roll support bar;

a cut off knife extending the length of the rolls and positioned at the discharge side of the rolls; and means for actuating the cut off knife whereby twine or sheet or netting may be fed between the rolls by actuation of the driven roll to insert less than a full wrap of said twine, sheet or netting into the bale forming mechanism, said twine, sheet or netting being then continuously drawn between the rolls by the bale forming mechanism and thereby wrapping the bale therewith, said knife subsequently movable to cut the twine or sheet or netting.

2. The improvement of claim 1 including means for driving the bale forming mechanism to form a round bale, said means for driving also including power means to drive the second driven roll, and further including clutch means intermediate the means for driving the bale forming mechanism and the second driven roll.

3. The improvement of claim 1 including first and second spaced twine guides, each guide mounted on the same carriage and both translatable simultaneously and axially with respect to the rolls, said guides being axially spaced to thereby provide for multiple and simultaneous wrapping of a bale with twine along the axial extent of the bale being wrapped.

4. The improvement of claim 1 wherein the carriage drive mechanism comprises a pulley mechanism for receiving said twine strand, said pulley mechanism driven by pulling of the twine strand through the rolls.

5. The improvement of claim 1 including means for adjusting the tension means for the roll support bar.

6. The improvement of claim 1 wherein the knife construction includes a knife blade positioned over the pathway of the twine, sheet and netting on the discharge side of the rolls and forming a cutting angle with the plane of twine, sheet or netting in the range of about fifty degrees (50°) to seventy degrees (70°).

7. The improvement of claim 5 wherein the knife blade forms on acute angle with the free end of the material being cut.

8. The improvement of claim 1 wherein in the knife construction comprises a serrated blade.

9. The improvement of claim 1 wherein the knife construction comprises:

a blade;

support arms attached to the blade;

a pivot support for the arms with the arms being mounted on the pivot support for pivotal motion of the blade in a projected position toward and a retracted position away from the twine, sheet or netting;

biasing means for normally biasing the arms toward engagement with the twine, sheet or netting, retention means for holding the arms in the retracted position;

means for disengaging the retention means, and means for sensing the movement of the blade to the projected position.

10. The improvement of claim 9 wherein the pivot support comprises a pivot rod mounted generally parallel to the rolls, said arms being attached to the rod for rotation therewith, and further including a lever arm also attached to the rod and extending generally in the opposite direction from the arm, said biasing means comprising a tension spring connected between the lever arm and the forward section, and said retention means comprising a plate member having a retention slot therein, said lever arm having a pin projecting therefrom and slidably received in the slot, said slot including a first run for retaining the pin and a second run for releasing the pin.

11. The improvement of claim 10 wherein the means for disengaging the retention means comprise means for moving the pin from the first run to the second run.

12. The improvement of claim 1 wherein the carriage drive mechanism comprises a pulley for receipt of a strand; an axle for mounting of said pulley;

a closed loop carriage drive chain in opposed relation to the carriage;

a transmission drivingly connecting the axle and drive chain; and a link connecting the chain to the carriage at a fixed point of the chain, said link movable with the chain to reciprocally drive the carriage.

13. The improvement of claim 1 including means for driving the driven roll, and clutch mean for engaging and disengaging the means for driving from the driven roll.

14. The improvement of claim 1 including sheet guide bands for the rolls on the upstream side of the rolls for guiding sheet or netting into the rolls.

15. The improvement of claim 1 wherein the roll support bar is pivotally attached at one end to the forward section and is pivotal for slidable receipt of a roll of sheet or netting.

16. The improvement of claim 1 wherein the roll support bar includes spaced hub members for cooperation with a roll of sheet or netting.

17. The improvement of claim 1 wherein the roll support bar is mounted over the rolls for discharge of sheet or netting downward between the rolls.

18. The improvement of claim 1 including control mean for sequentially:
(1) driving the rolls for feeding sheet, netting or twine between the rolls;
(2) terminating driving of the driven roll while continuing to feed sheet, netting or twine between the rolls until the formed bale is entirely wrapped a multiple number of times;
(3) initiating the cut-off knife to cut the sheet, netting or twine;
(4) resetting the cut-off knife; and
(5) opening the movable rear section for removal of the formed and wrapped bale.

* * * * *